(12) United States Patent
Sigl

(10) Patent No.: US 6,430,826 B1
(45) Date of Patent: Aug. 13, 2002

(54) BRICK PLACEMENT GUIDING APPARATUS AND METHOD OF THE SAME

(76) Inventor: Jeffrey J. Sigl, 342 S. Park La., Seymour, WI (US) 54165

( * ) Notice: Subject to any disclaimer, the term of this patent is extended or adjusted under 35 U.S.C. 154(b) by 36 days.

(21) Appl. No.: 09/595,459

(22) Filed: Jun. 16, 2000

(51) Int. Cl.[7] ................................................. G01C 15/10
(52) U.S. Cl. .............................. 33/408; 33/410; 33/518; 33/392
(58) Field of Search .......................... 33/408, 404, 406, 33/407, 410, 194, 197, 518, 526, 613, 644, 645, 392

(56) References Cited

U.S. PATENT DOCUMENTS

| | | | |
|---|---|---|---|
| 1,060,284 A | * 4/1913 | Platt | 33/410 |
| 1,086,679 A | * 2/1914 | McCarty | 33/392 |
| 2,503,098 A | * 4/1950 | Crocker | 33/410 |
| 2,559,697 A | 7/1951 | Anders | 33/406 |
| 2,952,915 A | * 9/1960 | Schrauder | 33/406 |
| 3,397,458 A | * 8/1968 | Wicklund | 33/410 |
| 4,329,786 A | 5/1982 | Martinez | 33/409 |
| 4,359,850 A | 11/1982 | Sinkes | 33/406 |
| 4,995,152 A | 2/1991 | Steckler | 33/409 |
| 5,009,015 A | 4/1991 | Redl | 33/409 |
| D357,623 S | 4/1995 | Davis | D8/354 |
| 5,915,809 A | * 6/1999 | Gilliam | 33/518 |
| 5,933,974 A | * 8/1999 | Walters et al. | 33/404 |

* cited by examiner

Primary Examiner—Randy W. Gibson

(57) ABSTRACT

A brick placement guiding apparatus and method of the same for guiding placement of a vertical series of protruding bricks in a plumb orientation. The brick placement guiding apparatus and method of the same includes a base plate adapted for mounting on an outer surface of the building adjacent to an opening in the building. An elongate arm is mounted on the base plate for extending outwardly from the outer surface of the building adjacent to the opening. A line support structure is mounted on the arm in a manner permitting movement of the line support structure in the longitudinal direction of the arm. A line is mounted on the line support structure for depending from the arm.

13 Claims, 4 Drawing Sheets

US 6,430,826 B1

BRICK PLACEMENT GUIDING APPARATUS AND METHOD OF THE SAME

BACKGROUND OF THE INVENTION

1. Field of the Invention

The present invention relates to devices for aligning bricks and more particularly pertains to a new brick placement guiding apparatus and method of the same for guiding placement of a vertical series of protruding bricks in a plumb orientation.

2. Description of the Prior Art

The use of devices for aligning bricks is known in the prior art. More specifically, devices for aligning bricks heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,359,850; U.S. Pat. No. 4,329,786; U.S. Pat. No. 5,009,015; U.S. Pat. No. 4,995,152; U.S. Pat. No. 2,559,697; and U.S. Pat. No. Des. 357,623.

While these devices fulfill their respective, particular objectives and requirements, the aforementioned patents do not disclose a new brick placement guiding apparatus and method of the same. The inventive device includes base plate adapted for mounting on an outer surface of the building adjacent to an opening in the building. An elongate arm is mounted on the base plate for extending outwardly from the outer surface of the building adjacent to the opening. A line support structure is mounted on the arm in a manner permitting movement of the line support structure in the longitudinal direction of the arm. A line is mounted on the line support structure for depending from the arm.

In these respects, the brick placement guiding apparatus and method of the same according to the present invention substantially departs from the conventional concepts and designs of the prior art, and in so doing provides an apparatus primarily developed for the purpose of guiding placement of a vertical series of protruding bricks in a plumb orientation.

SUMMARY OF THE INVENTION

In view of the foregoing disadvantages inherent in the known types of devices for aligning bricks now present in the prior art, the present invention provides a new brick placement guiding apparatus and method of the same construction wherein the same can be utilized for guiding placement of a vertical series of protruding bricks in a plumb orientation.

The general purpose of the present invention, which will be described subsequently in greater detail, is to provide a new brick placement guiding apparatus and method of the same, which has many of the advantages of the devices for aligning bricks mentioned heretofore and many novel features that result in a new brick placement guiding apparatus and method of the same which is not anticipated, rendered obvious, suggested, or even implied by any of the prior art devices for aligning bricks, either alone or in any combination thereof.

To attain this, the present invention generally comprises base plate adapted for mounting on an outer surface of the building adjacent to an opening in the building. An elongate arm is mounted on the base plate for extending outwardly from the outer surface of the building adjacent to the opening. A line support structure is mounted on the arm in a manner permitting movement of the line support structure in the longitudinal direction of the arm. A line is mounted on the line support structure for depending from the arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new brick placement guiding apparatus and method of the same, which has many of the advantages of the devices for aligning bricks mentioned heretofore and many novel features that result in a new brick placement guiding apparatus and method of the same which is not anticipated, rendered obvious, suggested, or even implied by any of the prior art devices for aligning bricks, either alone or in any combination thereof.

It is another object of the present invention to provide a new brick placement guiding apparatus and method of the same, which may be easily and efficiently manufactured and marketed.

It is a further object of the present invention to provide a new brick placement guiding apparatus and method of the same, which is of a durable and reliable construction.

An even further object of the present invention is to provide a new brick placement guiding apparatus and method of the same which is susceptible of a low cost of manufacture with regard to both materials and labor, and which accordingly is then susceptible of low prices of sale to the consuming public, thereby making such brick placement guiding apparatus and method of the same economically available to the buying public.

Still yet another object of the present invention is to provide a new brick placement guiding apparatus and method of the same which provides in the apparatuses and methods of the prior art some of the advantages thereof, while simultaneously overcoming some of the disadvantages normally associated therewith.

Still another object of the present invention is to provide a new brick placement guiding apparatus and method of the same for guiding placement of a vertical series of protruding bricks in a plumb orientation.

Yet another object of the present invention is to provide a new brick placement guiding apparatus and method of the same which includes base plate adapted for mounting on an outer surface of the building adjacent to an opening in the building. An elongate arm is mounted on the base plate for extending outwardly from the outer surface of the building adjacent to the opening. A line support structure is mounted on the arm in a manner permitting movement of the line support structure in the longitudinal direction of the arm. A line is mounted on the line support structure for depending from the arm.

Still yet another object of the present invention is to provide a new brick placement guiding apparatus and method of the same that eliminates the use of levels for guiding the vertical placement of bricks by permitting the user to simultaneously view the brick alignment and adjust the bricks accordingly.

Even still another object of the present invention is to provide a new brick placement guiding apparatus and method of the same that provides a semi-permanent aligning device that may be secured and then left in its using position until a series of bricks have been vertically aligned with little or no further adjustment to the device by the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
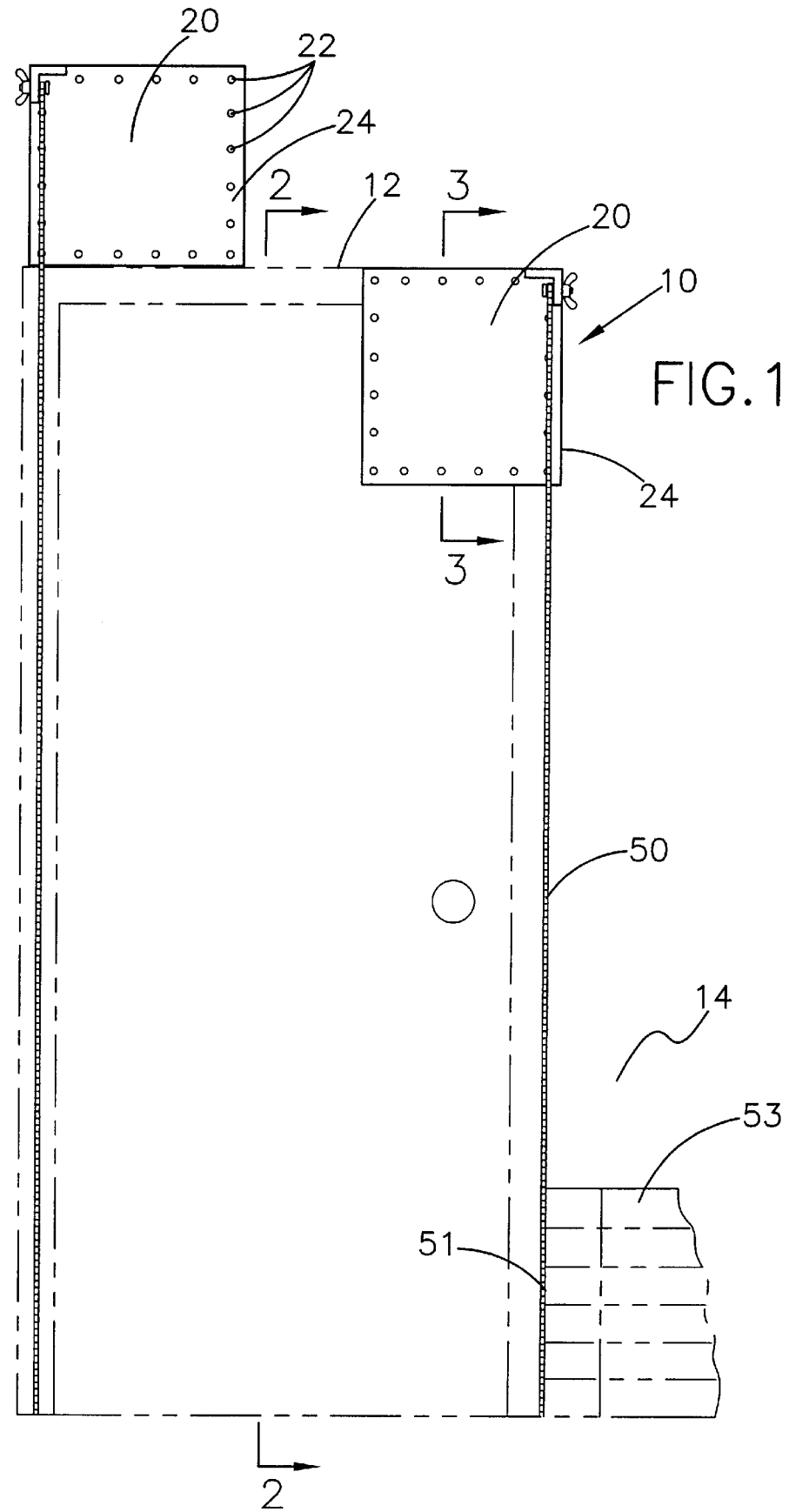
FIG. 1 is a schematic perspective view of two embodiments of the invention, where each embodiment of the invention is displayed at a different position with respect to an opening in the building.
Figure 2:
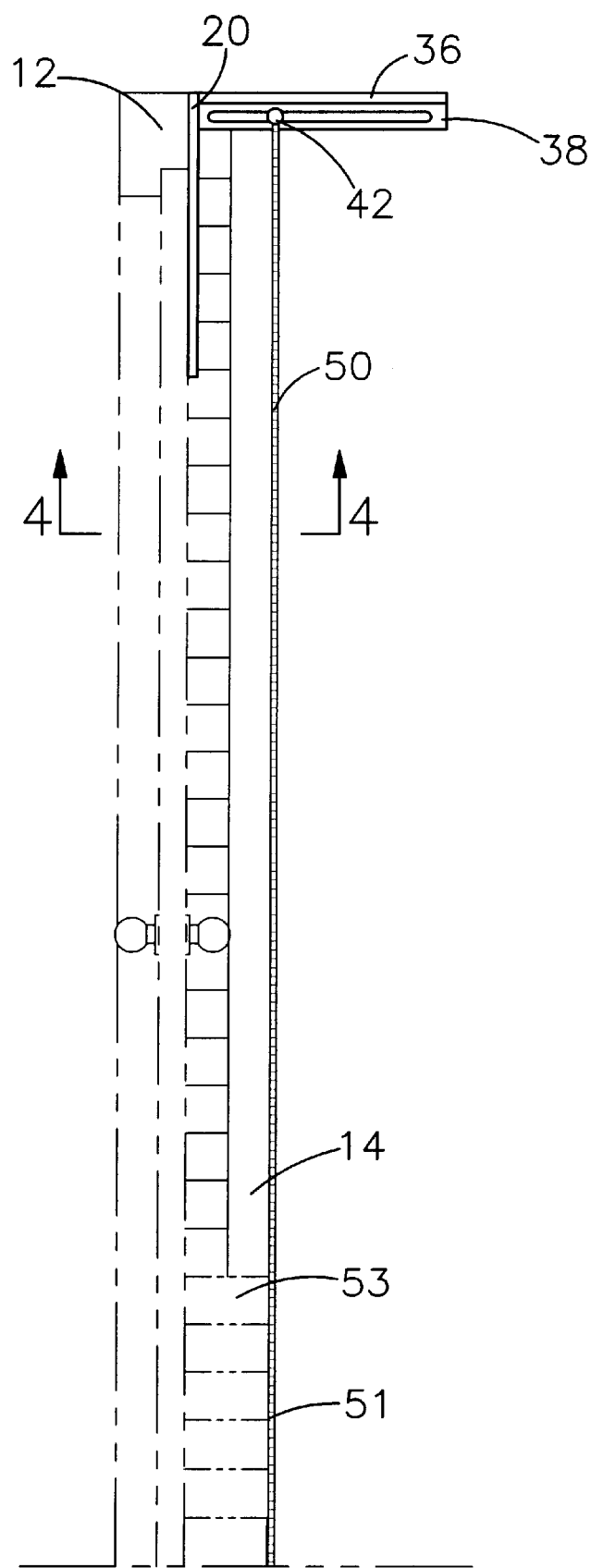
FIG. 2 is a schematic side view of the present invention taken along line 2—2 of FIG. 1.
Figure 3:
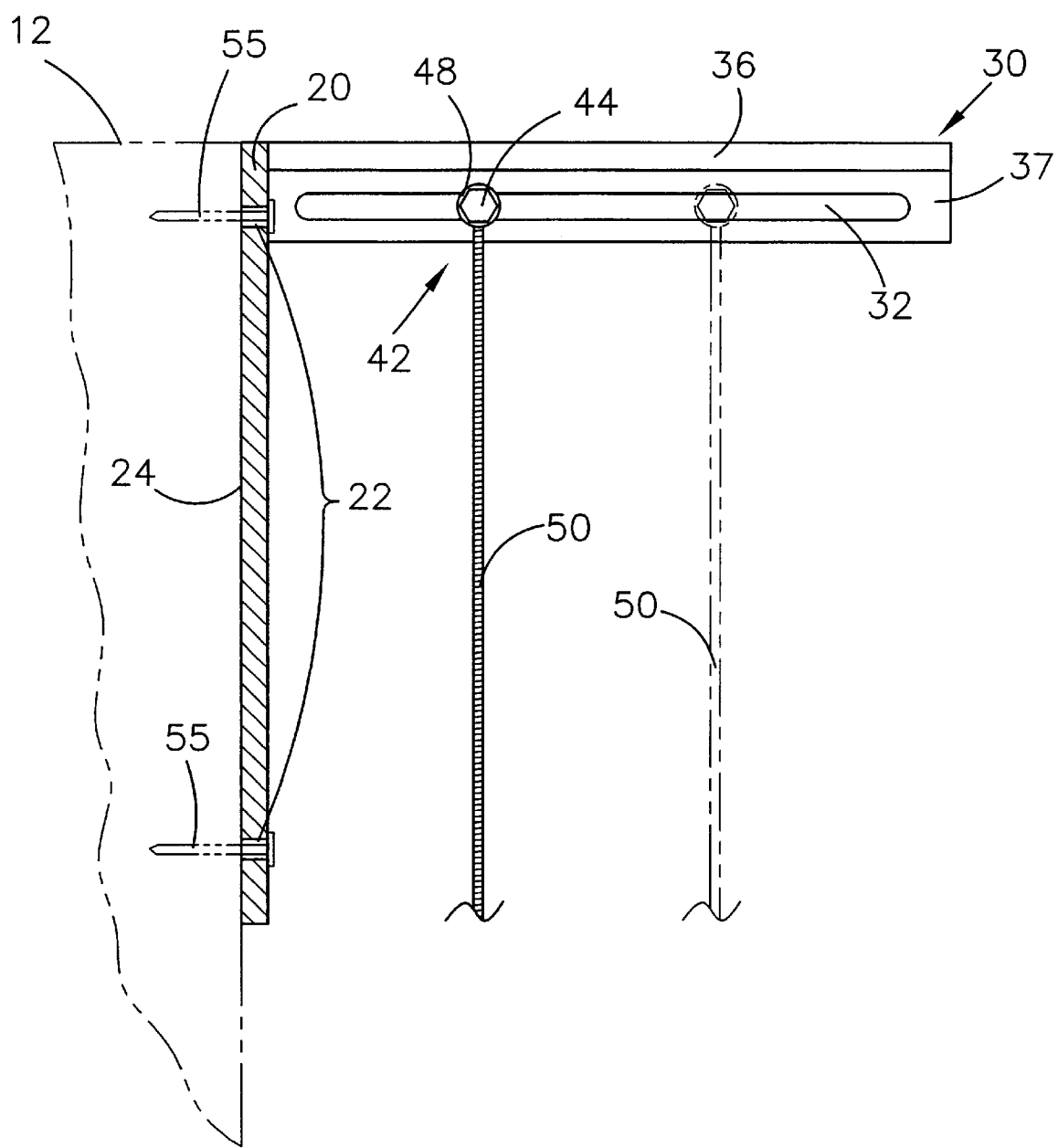
FIG. 3 is a schematic side view of the present invention taken along line 3—3 of FIG. 1.
Figure 4:
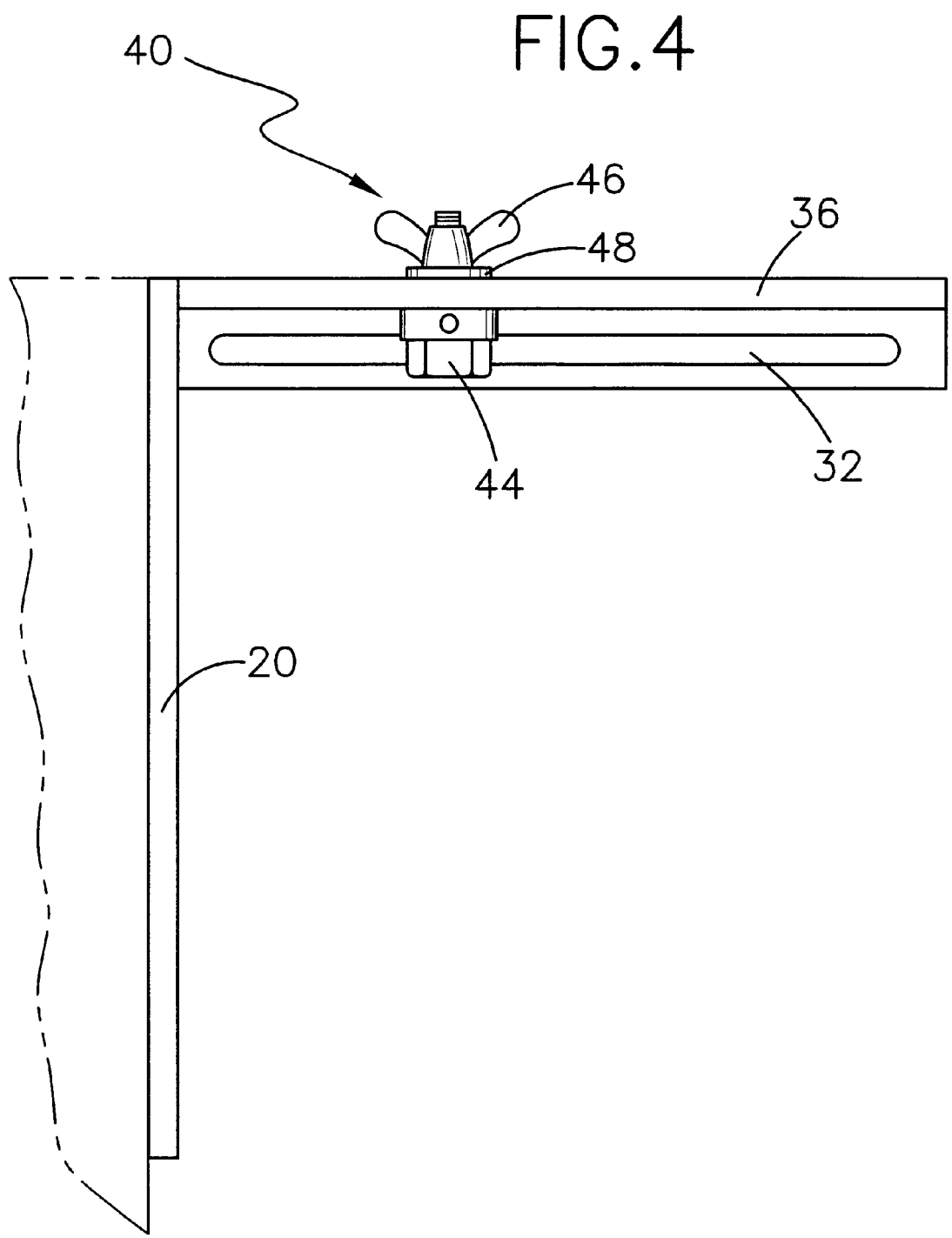
FIG. 4 is a schematic bottom view of the present invention taken along line 4—4 of FIG. 2.

With reference now to the drawings, and in particular to FIGS. 1 through 4 thereof, a new brick placement guiding apparatus and method of the same embodying the principles and concepts of the present invention and generally designated by the reference numeral 10 will be described.

As best illustrated in FIGS. 1 through 4, the brick placement guiding apparatus and method of the same 10 generally comprises a base plate 20 adapted for mounting on an outer surface 12 of the building adjacent to an opening 14 in the building. An elongate arm 30 is mounted on the base plate 24 for extending outwardly from the outer surface 12 of the building adjacent to the opening 14. A line support structure 40 is mounted on the arm 30 in a manner permitting movement of the line support structure 40 in the longitudinal direction of the arm 20. A line 50 is mounted on the line support structure for depending from the arm 30.

The base plate 20 is designed for mounting on an outer surface 12 of the building adjacent to the opening 14 in the building. The base plate 20 may include a plurality of mounting apertures 22 extending through the base plate 20 through which fasteners may pass to mount the plate to the building. The plurality of apertures 22 is positioned along a perimeter 24 of the base plate 20. Preferably, the perimeter 24 of the base plate 20 may be a square shape. In one illustrative embodiment, the perimeter 24 of the base plate 20 measures approximately 7 inches by 7 inches. Preferably, the base plate 20 comprises aluminum or another metal material.

An elongate arm 30 is mounted on the base plate 20 for extending outwardly from the outer surface 12 of the building adjacent to the opening 14. The arm 30 may include a slot 32 that extends in a longitudinal direction of the arm 30. In one embodiment of the invention, the arm 30 comprises an angle member 34 that includes a first extent and a second extent. The first extent is oriented substantially perpendicular to the second extent. The slot 32 is formed in the second extent of the angle member 34. The elongate arm 30 may preferably be located adjacent to a corner of the base plate 20. In one embodiment, the arm 30 comprises an aluminum angle stock material.

A line support structure 40 is mounted on the arm 30 in a manner permitting movement of the line support structure 40 in the longitudinal direction of the arm 30. The line support structure 40 is mounted in the slot 32 of the arm 30. Preferably, the line support structure 40 comprises a fastener assembly 42. The fastener assembly 42 is selectively fixable at locations along the arm 30. The fastener assembly 42 may comprise a bolt 44, a wing nut 46, and at least one washer 48. A line 50 is mounted on the line support structure 40 for depending from the arm 30.

One method of using the aforedescribed apparatus comprises mounting the base plate 20 on an outer surface 12 of a building in a position adjacent to an opening 14 in the building. In one embodiment of the invention, the base plate 20 is mounted by inserting a nail 55 through each of the plurality of apertures 22. The line support structure 40 is adjusted so that a distance between the outer surface 12 of the building and the line 50 approximates a desired protrusion 51 of a vertical series of bricks 53 from the outer surface 12 of the building. The vertical series of bricks 53 are placed adjacent to the opening 14. A portion or an outer surface of the bricks 53 is located adjacent to the line depending from the arm 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for guiding placement of a vertical series of protruding bricks in a plumb orientation adjacent to an opening in a building, the apparatus comprising:
    a base plate adapted for mounting on an outer surface of the building adjacent to the opening in the building;
    an elongate arm mounted on the base plate and extending outwardly from the base plate;
    a line support structure mounted on the arm in a manner permitting movement of the line support structure in the longitudinal direction of the arm;
    a line mounted on the line support structure for depending from the arm;
    a plurality of mounting apertures extending through the base plate; wherein the base plate has a substantially planar back side for abutting against the outer surface of the building, the base plate having a pair of edges extending from said back side, the pair of side edges extending substantially perpendicular to each other for aligning with sides of the opening of the building, a portion of the plurality of mounting apertures being located along each of said side edges for receiving fasteners extending into the building along the sides of the opening such that the base plate is extendable over a portion of the opening in the building.

2. The apparatus of claim 1 wherein the base plate has a planar front side.

3. The apparatus of claim 1 wherein the plurality of apertures are positioned along a perimeter of the base plate with substantially uniform spacing between the apertures.

4. The apparatus of claim 1 wherein the base plate has a square perimeter.

5. The apparatus of claim 4 wherein the perimeter of the base plate measures approximately 7 inches by 7 inches.

6. The apparatus of claim 1 wherein the arm has a slot extending in a longitudinal direction of the arm.

7. The apparatus of claim 1 wherein the arm comprises an angle member having a first extent and a second extent, the first extent being oriented substantially perpendicular to the second extent, a slot being formed in the second extent of the angle member.

8. The apparatus of claim 1 wherein the elongate arm is mounted on the base plate at a location adjacent to a corner of the base plate.

9. The apparatus of claim 6 wherein the line support structure is mounted in the slot of the arm.

10. The apparatus of claim 1 wherein the line support structure comprises a fastener assembly selectively fixable at locations along the arm.

11. The apparatus of claim 10 wherein the fastener assembly comprises a bolt and a wing nut, the fastener assembly also including at least one washer.

12. An apparatus for guiding placement of a vertical series of protruding bricks in a plumb orientation adjacent to an opening in a building, the apparatus comprising:
    a base plate adapted for mounting on an outer surface of the building adjacent to the opening in the building, the base plate having a plurality of mounting apertures extending through the base plate, the base plate having a substantially planar back side for abutting against the outer surface of the building, the base plate having a pair of edges extending from said back side, the pair of side edges extending substantially perpendicular to each other for aligning with sides of the opening of the building, a portion of the plurality of mounting apertures being located along each of said side edges for receiving fasteners extending into the building along the sides of the opening such that the base plate is extendable over a portion of the opening in the building, the plurality of apertures being positioned along a perimeter of the base plate with substantially uniform spacing between the apertures, the base plate having a square perimeter, the perimeter of the base plate measuring approximately 7 inches by 7 inches;
    an elongate arm mounted on the base plate for extending outwardly from the outer surface of the building adjacent to the opening, the arm having a slot extending in a longitudinal direction of the arm, the arm comprising an angle member having a first extent and a second extent, the first extent being oriented substantially perpendicular to the second extent, the slot being formed in the second extent of the angle member, the elongate arm being located adjacent to a corner of the base plate;
    a line support structure mounted on the arm in a manner permitting movement of the line support structure in the longitudinal direction of the arm, the line support structure being mounted in the slot of the arm, the line support structure comprising a fastener assembly selectively fixable at locations along the arm, the fastener assembly comprising a bolt and a wing nut, the fastener assembly also including at least one washer; and
    a line mounted on the line support structure for depending from the arm.

13. A method for guiding placement of a vertical series of protruding bricks in a plumb orientation adjacent to an opening in a building, the method comprising:
    providing a guidance apparatus comprising a base plate adapted for mounting on an outer surface of the building adjacent to the opening in the building, an elongate arm mounted on the base plate for extending outwardly from the outer surface of the building adjacent to the opening, a line support structure mounted on the arm in a manner permitting movement of the line support structure in the longitudinal direction of the arm, and a line mounted on the line support structure for depending from the arm, the base plate having a substantially planar back side for abutting against the outer surface of the building, the base plate having a pair of edges extending from said back side, the pair of side edges extending substantially perpendicular to each other for aligning with sides of the opening of the building, a portion of the plurality of mounting apertures being located along each of said side edges for receiving fasteners extending into the building along the sides of the opening such that the base plate is extendable over a portion of the opening in the building;
    mounting the base plate on an outer surface of a building in a position adjacent to an opening in the building;
    adjusting the line support structure so that a distance between the outer surface of the building and the line approximates a desired protrusion of the vertical series of bricks from the outer surface of the building; and
    placing a vertical series of bricks adjacent to the opening with a portion of the bricks being located adjacent to the line depending from the arm.

* * * * *